US 12,358,577 B2

(12) United States Patent
Xavier et al.

(10) Patent No.: US 12,358,577 B2
(45) Date of Patent: Jul. 15, 2025

(54) CAST IDLER WHEEL

(71) Applicant: Caterpillar Inc., Peoria, IL (US)

(72) Inventors: Martin Tagore Joseph Xavier, Chennai (IN); Brian B. Umbach, Peoria, IL (US); Chetan Vilas Dahiwal, Chennai (IN)

(73) Assignee: Caterpillar Inc., Peoria, IL (US)

( * ) Notice: Subject to any disclaimer, the term of this patent is extended or adjusted under 35 U.S.C. 154(b) by 559 days.

(21) Appl. No.: 17/743,040

(22) Filed: May 12, 2022

(65) Prior Publication Data

US 2023/0365206 A1    Nov. 16, 2023

(51) Int. Cl.
*B62D 55/14* (2006.01)
*B62D 55/092* (2006.01)

(52) U.S. Cl.
CPC .......... *B62D 55/14* (2013.01); *B62D 55/092* (2013.01)

(58) Field of Classification Search
CPC ....... B62D 55/14; B62D 55/12; B62D 55/092
See application file for complete search history.

(56) References Cited

U.S. PATENT DOCUMENTS

| | | | |
|---|---|---|---|
| 3,601,212 A | 8/1971 | Peterson et al. | |
| 3,771,843 A * | 11/1973 | Clasper | B21D 53/26 474/197 |
| 3,842,475 A * | 10/1974 | Clasper | B21D 53/26 228/113 |
| 3,915,511 A | 10/1975 | Clasper et al. | |
| 3,979,154 A | 9/1976 | Groff | |
| 5,022,718 A | 6/1991 | Diekevers | |
| 8,414,091 B2 | 4/2013 | Pech et al. | |
| 11,679,825 B2 * | 6/2023 | Suanno | B60B 3/087 305/136 |
| 2021/0300488 A1 | 9/2021 | Erdfmann | |

FOREIGN PATENT DOCUMENTS

| CN | 211568137 U | 9/2020 |
|---|---|---|
| CN | 110735082 B | 6/2021 |
| CN | 215794126 | 2/2022 |
| DE | 706728 | 6/1941 |
| JP | S58103965 | 7/1983 |

* cited by examiner

*Primary Examiner* — Jason R Bellinger (57) ABSTRACT

An idler wheel includes a hub, an outer rim, and a pair of side plates that form an interior cavity extending radially between the outer rim (110) and the hub, and axially between the pair of side plates. The first side plate defines a maximum side plate axial thickness disposed radially next to the hub in a cross-sectional plane containing a radial direction, and an axis of rotation, as well as a minimum side plate thickness disposed radially next to the outer rim. A ratio of the maximum thickness to the minimum thickness ranges from 1.325 to 1.900.

24 Claims, 9 Drawing Sheets

CAST IDLER WHEEL

TECHNICAL FIELD

The present disclosure relates generally to the manufacturing process for producing an idler wheel. More specifically, the present disclosure relates to the geometry that facilitates manufacturing the idler wheel using a casting process.

BACKGROUND

Idler wheels are routinely used by machines in the earthmoving, mining, agricultural, and construction industries, etc. to guide the track chain of its undercarriage, and/or support the weight of the machine as well as impact loads in use. These components are typically manufactured as an assembly, which may increase cost and decrease reliability due to the multiple joints necessary to create such an assembly. More specifically, the side plate and hub of such an idler wheel assembly may be welded together. But, this creates a weak point that may limit the useful life of the idler assembly, necessitating maintenance and unwanted downtime for the machine employing the idler assembly.

CN110735082B discloses a guide wheel for endless track drives. The guide wheel comprises a guide wheel body having a wheel body base body, an outer wheel ring, and a wheel hub. Also, the guide wheel includes an inner wheel ring, and wheel spokes connecting the wheel hub and the inner. The outer wheel ring is made of a wear-resistant material and is fixedly connected with the inner wheel ring at the circumferential surface of the radial outer side of the inner wheel ring. The guide wheel is manufactured using a process that includes the following steps. The wheel body base body has a first component or a blank of the first component of the outer rim that is integrally formed with a second component or a blank of the second component of the wheel body base body. This is done via a casting process.

However, the '082 patent does not address the manufacturing process in sufficient enabling detail. Also, the '082 patent does not teach how to make the entire idler wheel so that its weight is reduced to decrease costs, while also providing the necessary robustness.

SUMMARY OF THE DISCLOSURE

An idler wheel according to an embodiment of the present disclosure may define an axis of rotation, a radial direction, and a circumferential direction. The idler wheel may comprise a hub, an outer rim, and a first side plate, and a second side plate extending radially from the hub to the outer rim. The hub, the outer rim, the first side plate, and the second side plate may be formed as a unitary component. Also, the first side plate may define a first thru-aperture, and the second side plate may define a second thru-aperture.

An idler wheel according to another embodiment of the present disclosure may comprise a hub defining a cylindrical bore with an axis of rotation, a radial direction, and a circumferential direction, as well as an outer rim. Also, a first side plate, and a second side plate may extend radially from the hub to the outer rim. The hub, the outer rim, the first side plate, and the second side plate may form an interior cavity radially between the outer rim and the hub, and axially between the first side plate, and the second side plate. The first side plate may define a maximum first side plate axial thickness disposed radially next to the hub in a cross-sectional plane containing the radial direction and the axis of rotation, as well as a minimum first side plate thickness disposed radially next to the outer rim. A ratio of the maximum first side plate axial thickness to the minimum first side plate thickness may range from 1.325 to 1.900.

An idler wheel according to another embodiment of the present disclosure may comprise a hub defining a cylindrical bore with an axis of rotation, a radial direction, and a circumferential direction, as well as an outer rim. A first side plate, and a second side plate may extend radially from the hub to the outer rim. The hub, the outer rim, the first side plate, and the second side plate may form an interior cavity radially between the outer rim and the hub, and axially between the first side plate, and the second side plate. A rib may be disposed in the interior cavity extending from the first side plate to the second side plate in a cross-sectional plane containing the radial direction and the axis of rotation. The rib may define a rib aperture extending circumferentially through the rib.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of an idler wheel are disclosed that may improve the manufacturing process, reduce the material needed to manufacture the idler wheel, and provide the necessary robustness to support the weight of a machine and impact loads in use. More specifically, the geometry of the idler wheel may allow it to be manufactured as a unitary cast component in some embodiments of the present disclosure.

Figure 1:
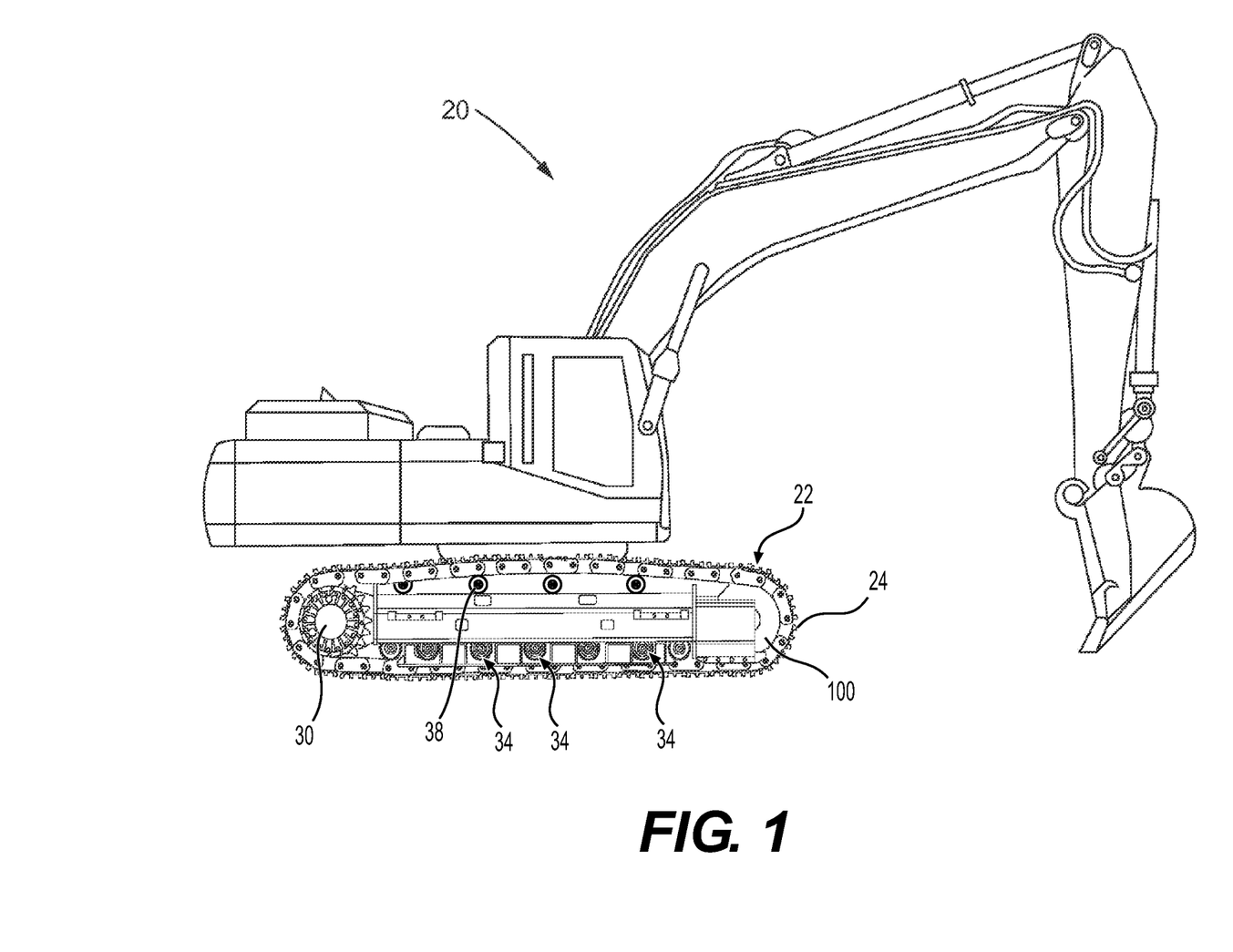
FIG. 1 is a side view of a machine such as a hydraulic excavator using an idler wheel configured according to an embodiment of the present disclosure.

FIG. 1 shows an embodiment of a tracked machine 20 in the form of an excavator that includes an embodiment of an idler wheel constructed in accordance with principles of the present disclosure. Among other uses, an excavator can be used to remove material using a bucket from a work site.

More specifically, FIG. 1 illustrates a machine 20 including an undercarriage system 22 with a track assembly 24, consistent with certain embodiments of the present disclosure. It is to be understood that although the machine 20 is illustrated as a hydraulic excavator, the machine 20 may be of any other type that includes a tracked undercarriage system 22. As used herein, the term "machine" refers to a mobile machine that performs a driven operation involving physical movement associated with a particular industry, such as, earthmoving, construction, landscaping, forestry, mining, agriculture, etc.

For example, the machine may be a hydraulic mining shovel, a wheel loader, a cable shovel, a track type tractor, a dozer, or dragline or the like. Moreover, one or more implements may be connected to the machine. Such implements may be utilized for a variety of tasks, including, for example, lifting and loading.

Figure 2:
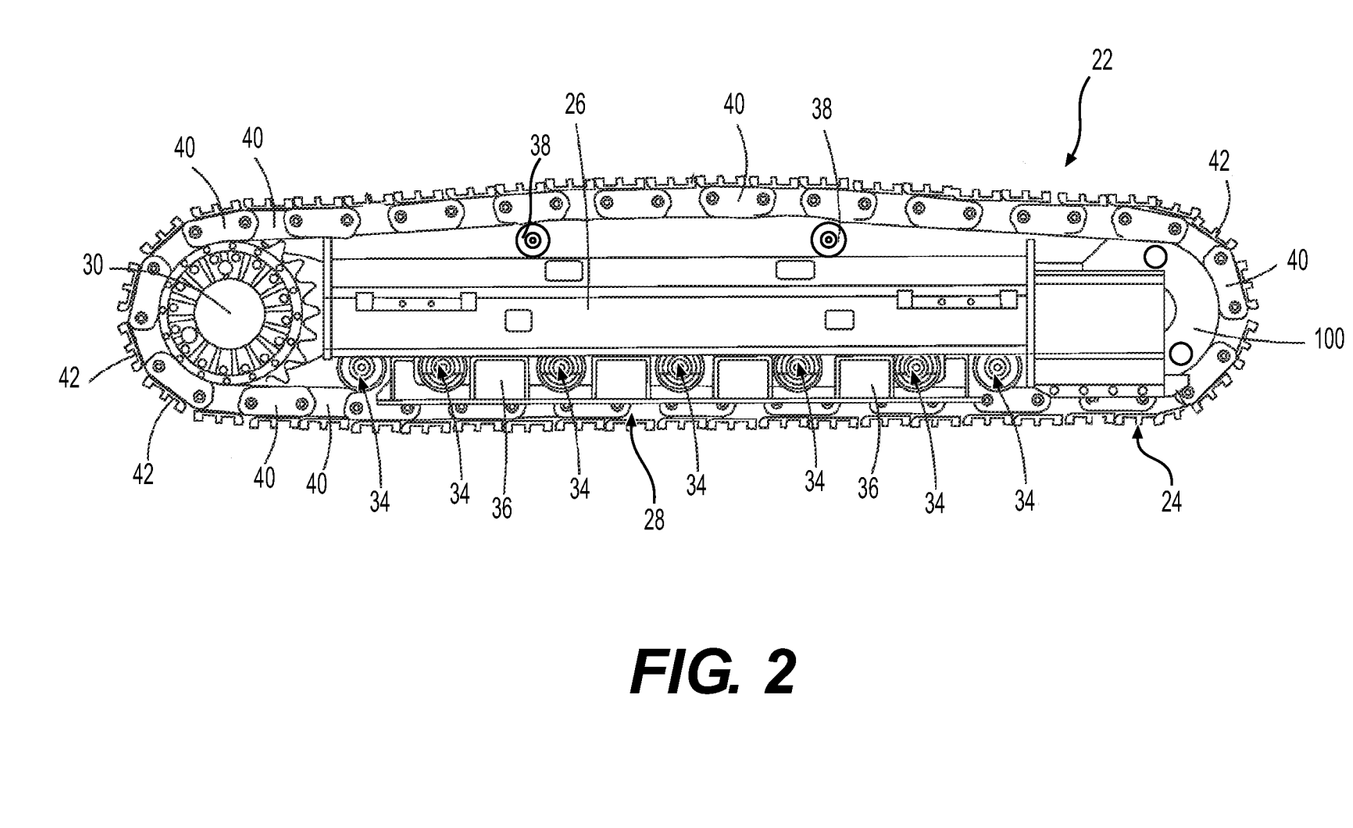
FIG. 2 is a side view of the undercarriage of FIG. 1 shown in isolation from the rest of the machine.
Figure 3:
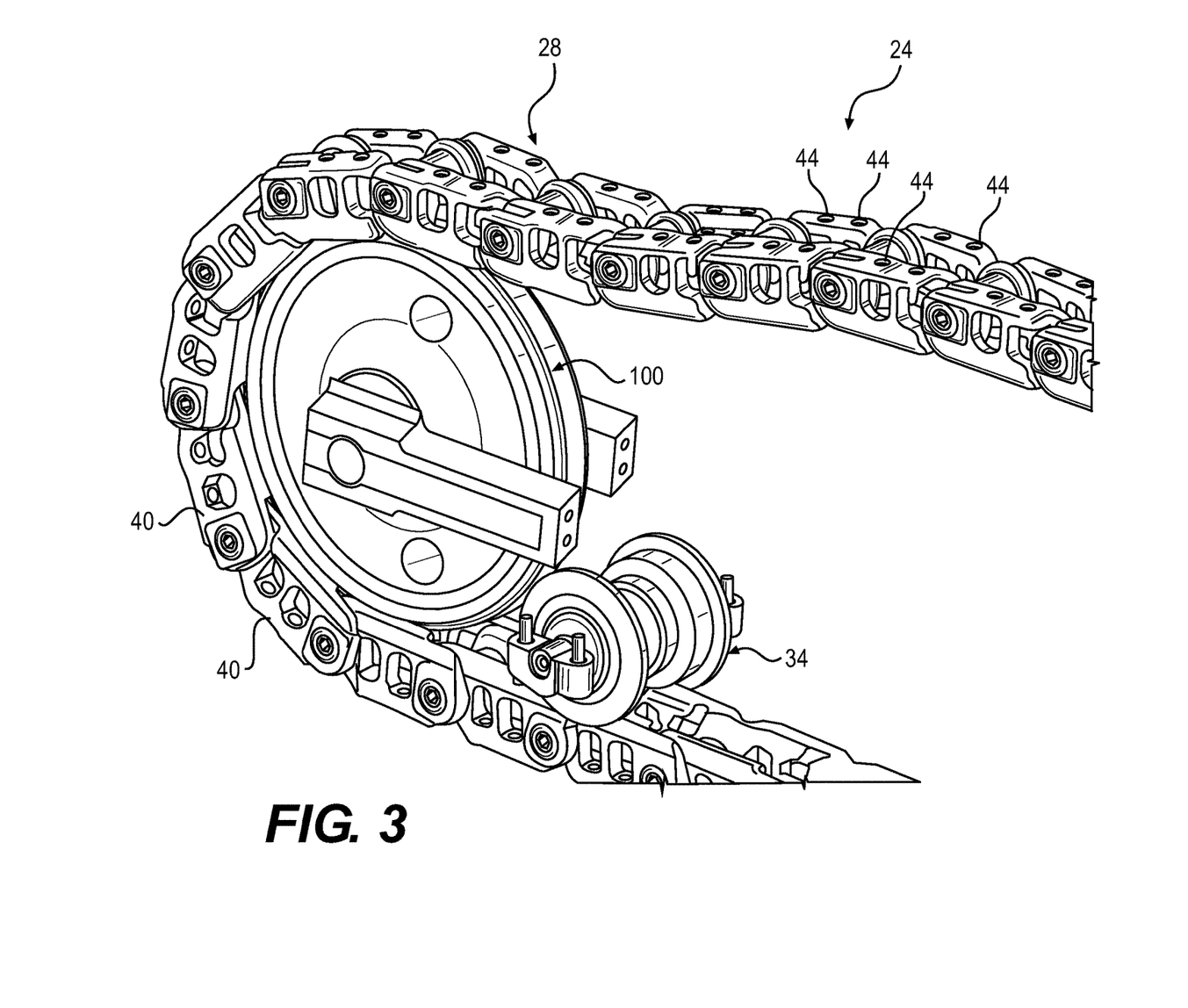
FIG. 3 is a perspective view of an idler wheel engaging the track chain, and rollers of the undercarriage of FIG. 2 with the rest of the undercarriage removed for enhanced clarity.

The undercarriage system 22 may be configured to support the machine 20 and move the machine 20 along the ground, road, and other types of terrain. As shown in FIGS. 2 and 3, the track chain assembly 24 of the undercarriage system 22 may include a track roller frame 26, and various guiding components connected to the track roller frame 26. The guiding components may guide the track and include a drive sprocket 30, an idler wheel 100, supper rollers 34, track guides 36, and carrier rollers 38, although other components may be used.

The track chain assembly 24 may include a plurality of track links 40 with a plurality of shoes 42 secured thereto. The rotatable connection between adjacent track links 40 may form a flexible backbone of the track chain assembly 24, and the shoes 42 may provide traction on the various types of terrain. The track links 40 may extend in an endless chain around the drive sprocket 30, the support rollers 34 that support the heavy load of the machine 20, and also around the idler wheel, and the carrier rollers 38.

As can be understood by looking at FIG. 3, the track shoes 42 (not shown in FIG. 3) may be secured to the outer perimeter of the track chain assembly 24. For example, one shoe 42 may be attached to each laterally spaced pair of links 40 via fasteners (not shown) that connect the track shoes to the links via threaded apertures 44. Other methods of attachment may be employed in other embodiments.

Figure 4:
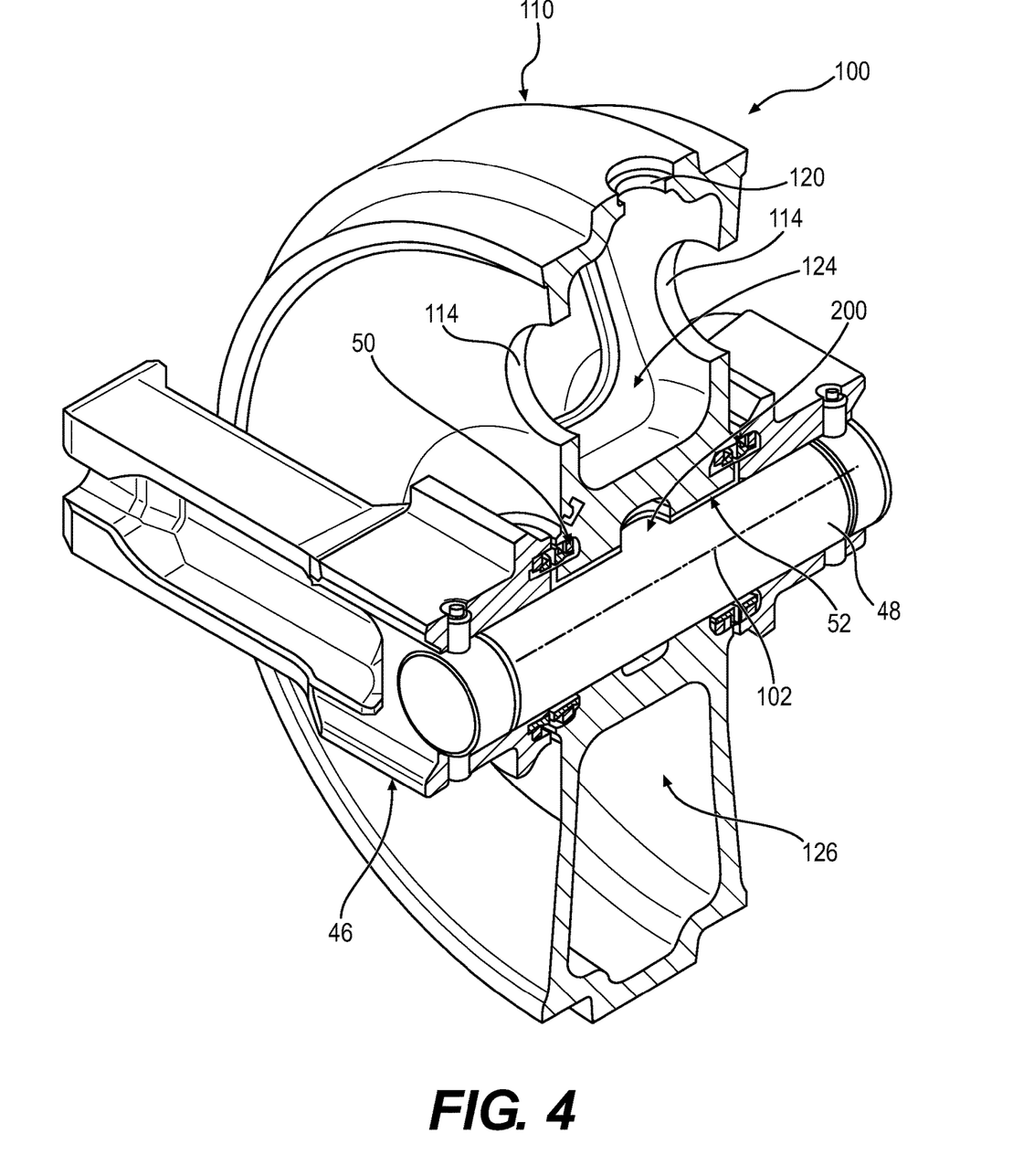
FIG. 4 is a perspective sectioned view of the idler wheel of FIG. 3 shown mating with a yoke via a shaft.

FIG. 4 illustrates the idler wheel 100 being held in place by a yoke 46 and a shaft 48 in a rotating manner. Metal-to-metal face seals 50 (e.g., may be DUO CONE face seals) are also shown that allow the idler wheel 100 to rotate relative to the yoke 46. Also, a thrust washer, and a lubrication groove 200 are depicted. As can be seen, the idler wheel 100 is hollow, but may also be unitary.

To achieve this result, various embodiments of an idler wheel that are configured to facilitate its manufacture as a unitary component via a lost core or hollow core casting process will now be described.

Figure 5:
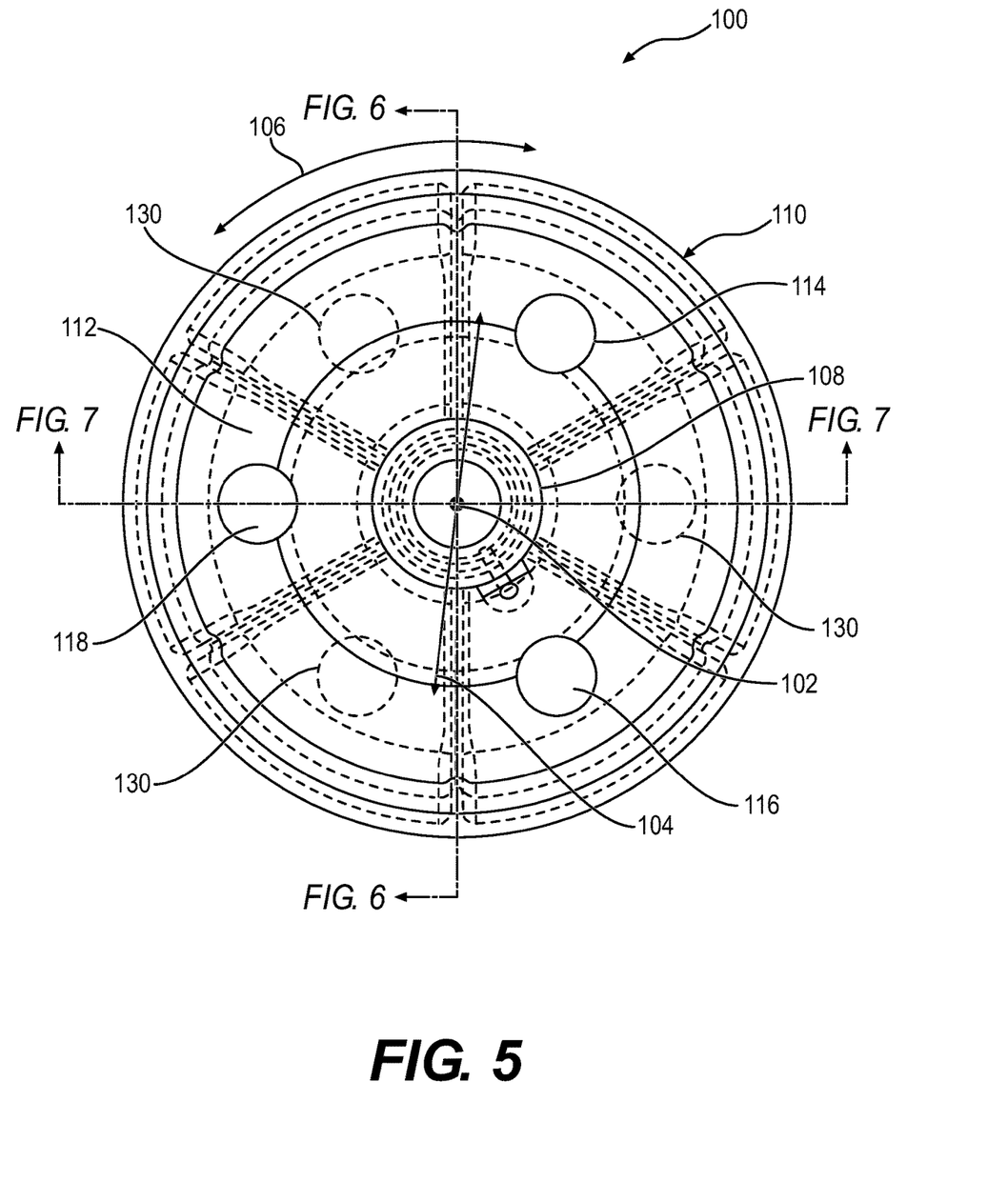
FIG. 5 is an unsectioned side view of the idler wheel of FIG. 4 shown in isolation.
Figure 6:
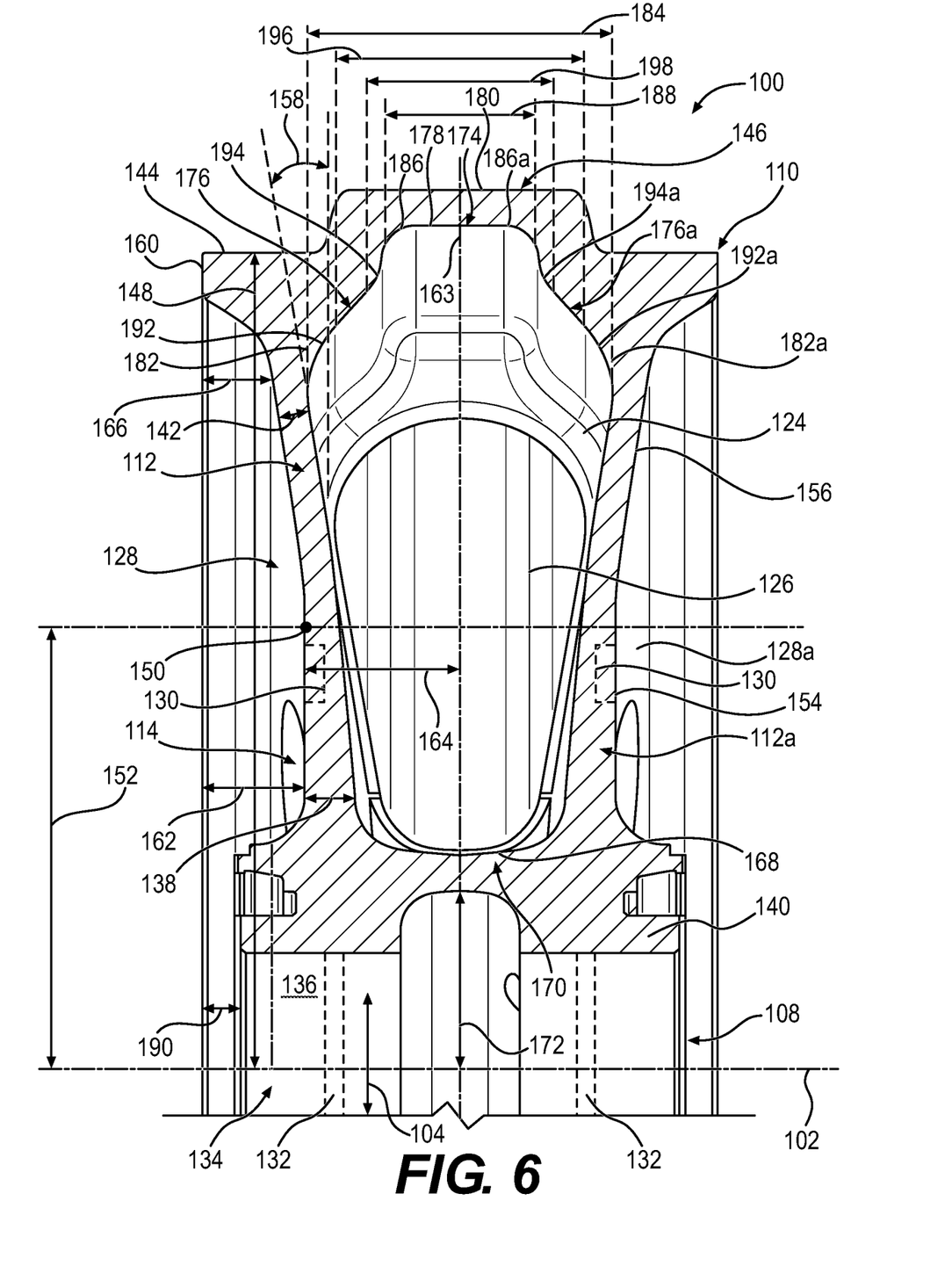
FIG. 6 is sectioned view of the idler wheel of FIG. 5 taken along lines 6-6 thereof. Only the portion of the cross-section (e.g., the right side of the idler wheel in FIG. 5) lacking a standoff aperture is shown. This cross-section is between the ribs of the idler wheel.

Such an idler wheel 100 is shown in FIGS. 5 and 6, and may define an axis of rotation 102, a radial direction 104, and a circumferential direction 106. Also, the idler wheel 100 may comprise a hub 108, an outer rim 110, a first side plate 112, and a second side plate 112a extending radially from the hub 108 to the outer rim 110. As shown in FIGS. 5 and 6, the hub 108, the outer rim 110, the first side plate 112, and the second side plate 112a may be formed as a unitary component (but not necessarily so). To facilitate the casting process, the first side plate 112 may define a first thru-aperture 114 (e.g., extends axially completely through the first side plate), while the second side plate 112a may define a second thru-aperture 116 (see FIG. 8).

Figure 8:
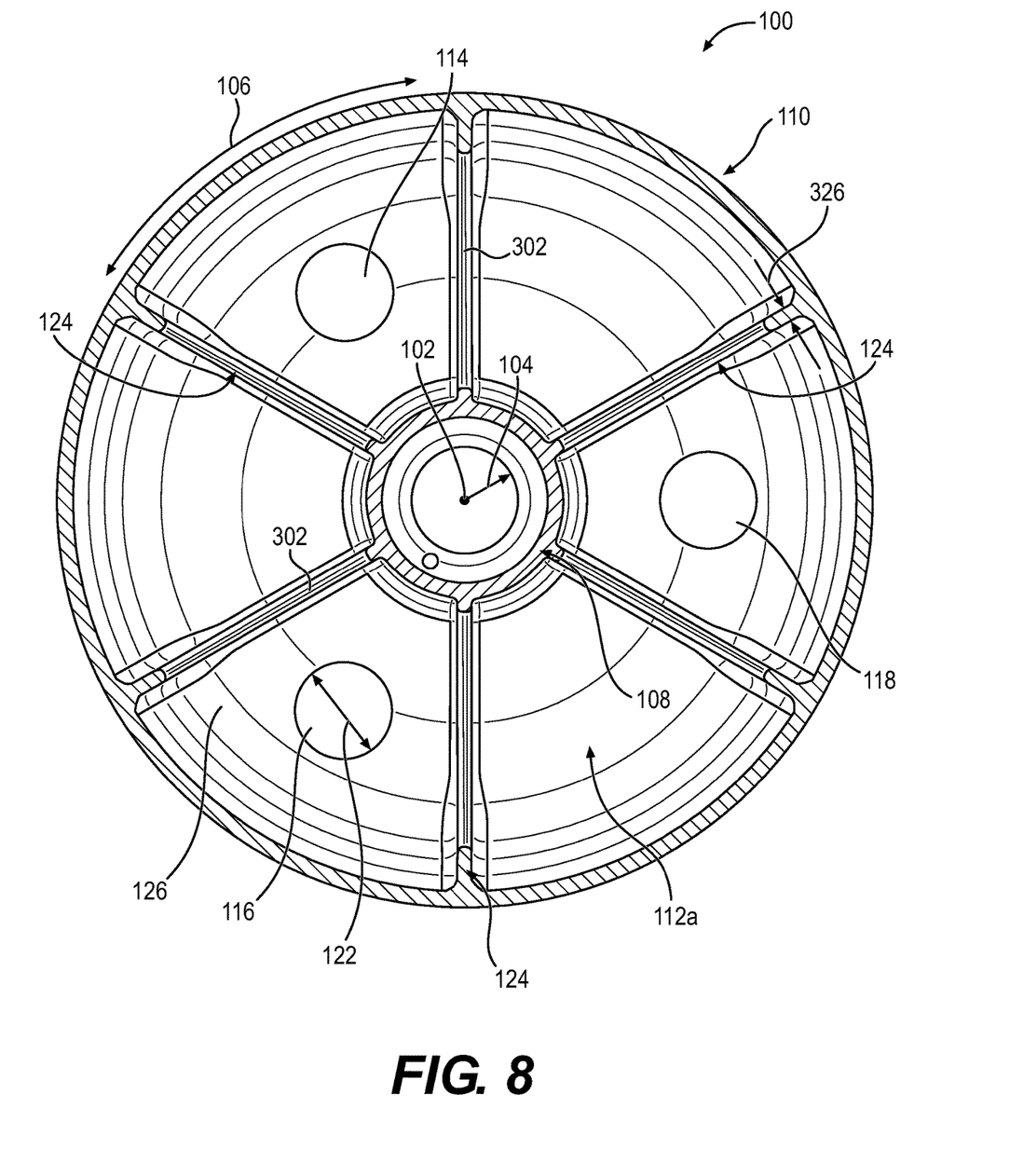
FIG. 8 is a sectional view of the idler wheel of FIG. 5 taken along the midplane shown in FIG. 6.

Referring to FIGS. 5 and 8, the first side plate 112 may define a third thru-aperture 118 that is spaced circumferentially away from the first thru-aperture 114, and the second thru-aperture 116. At the same time, the first thru-aperture 114 may be spaced circumferentially away from the second thru-aperture 116, and the third thru-aperture 118.

In some embodiments, the first thru-aperture 114, the second thru-aperture 116, and the third thru aperture 118 may extend completely through the first side plate 112 and the second side plate 112a. This may allow support pillars to extend through these apertures in a mold to hold the hollow core axially in place so that when the casting is poured, the hollow core forms the interior geometry of the idler wheel. Though not shown, the support pillars may have a pilot portion that also holds the hollow core in proper position radially. After the casting process is complete, the idler wheel may be removed from mold so that these apertures are empty. Then, the hollow core may be shaken (when sand cores are used), dissolved, melted, or otherwise loosened or liquified, allowing it to flow out of these apertures.

In addition to or in lieu of these apertures as shown in FIG. 4, the outer rim further 110 may further define at least one radially extending aperture 120 that extends completely through the outer rim 110. A series of similar apertures may be spaced circumferentially along the outer rim. These apertures may also be used to support or properly position the hollow core, and/or allow the hollow core to flow out of them after its loosening or liquification.

As seen in FIGS. 5 and 8, the first thru-aperture 114, the second thru-aperture 116, and the third thru-aperture 118 form a circular array circumferentially about the axis of rotation 102 separated by 120.0 degrees. In such a case, the aperture diameter 122 for all the apertures may range from 58.0 mm (millimeters) to 72.0 mm, but in no case less than 38.0 mm. In other embodiments, the apertures may be spaced circumferentially 60.0 degrees apart (i.e. there would be six apertures) and the aperture diameter of these apertures could range from 38.0 mm to 52.0 mm. Other arrangements, configurations, and sizes of these apertures are possible in other embodiments of the present disclosure.

Figure 7:
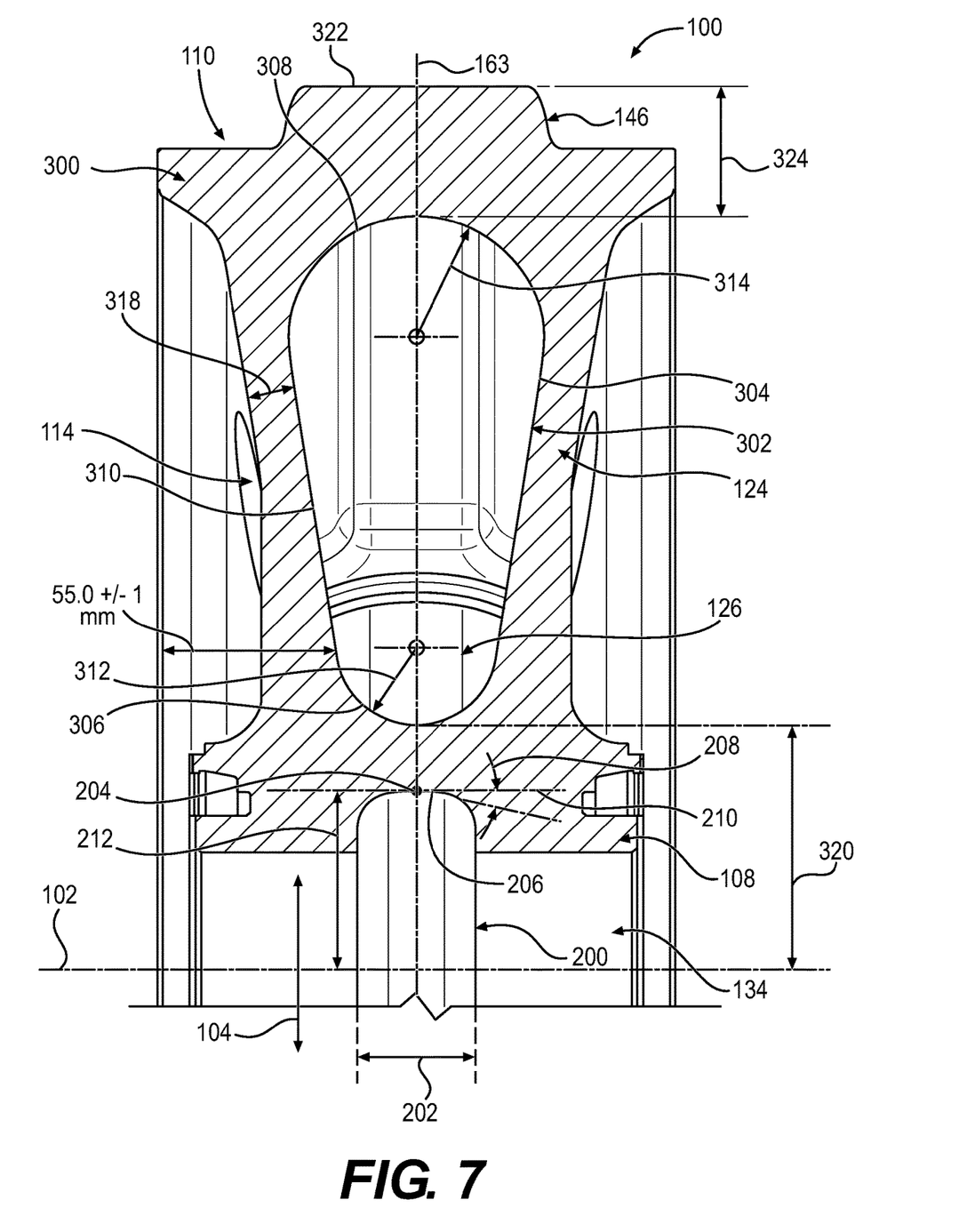
FIG. 7 is a sectioned view of the idler wheel of FIG. 5 taken along lines 7-7 thereof through a top rib and a bottom rib. Only the upper portion of the cross-section is shown.

As best understood with reference to FIGS. 4, 7, and 8, one or more ribs 124 may extend from the outer rim 110 to the hub 108 in the interior cavity 126 that is spaced circumferentially between the first thru-aperture 114, and the second thru-aperture 116. More specifically, the ribs 124 may be identical and may form a circular array about the axis of rotation 102, being spaced apart at 60.0 degree intervals. The apertures 114, 116, and 118 may be straddled by these ribs 124, being centered therebetween. Other configurations, arrangements, and sizes of the ribs are possible in other embodiments of the present disclosure.

The idler wheel 100 may be gated in various manners. For example, as shown in FIGS. 5 and 6, the first side plate 112 may define a first radially extending exterior surface 128, and the second side plate 112a may define a second radially extending exterior surface 128a. In between the ribs 124 circumferentially (e.g., where there is no thru-aperture 114, 116, 118), a plurality of gate blemishes 130 may be disposed on the first radially extending exterior surface 128 and/or the second radially extending exterior surface 128a.

In addition to or in lieu of these gate locations, the hub 108 may define a ring gate blemish 132 on its exterior or interior. For example, the hub 108 may define a central bore 134 that includes a cylindrical surface 136 that defines the axis of rotation 102, and receives the shaft 48 as shown in FIG. 4. Such a ring gate blemish(s) 132 is shown in FIG. 6. This area of the hub may also be formed by another hollow core, and/or may be machined to the desired shape.

Focusing on FIG. 6, it can be clearly seen that the hub 108, the outer rim 110, the first side plate 112, and the second side plate 112 a form the interior cavity 126 radially between the outer rim 110 and the hub 108, and axially between the first side plate 112, and the second side plate 112 a. The first side plate 112 may define a maximum first side plate axial thickness 138 disposed radially next to the hub 108 in a cross-sectional plane (e.g., the sectioned plane of FIG. 6; such as being parallel to a cross-sectional plane of an inner flange portion 140, etc.) containing the radial direction 104, and the axis of rotation 102. Also, the first side plate may further define a minimum first side plate thickness 142 that is disposed radially next to the outer rim 110.

A ratio of the maximum first side plate axial thickness 138 to the minimum first side plate thickness 142 may range from 1.325 to 1.900 (or otherwise may be greater than 1.1). This ratio may help to provide the desired strength to withstand the weight of the machine and impact loads, while also minimizing the amount of material used to make the idler wheel without adversely affecting the flow of material during the casting process simultaneously.

In some embodiments, and the minimum first side plate thickness 142 may be 12.0 mm or less. More specifically, the minimum first side plate thickness 142 may range from 10.0 mm to 12.0 mm in small embodiments, but may range from 8.0 mm to 28.0 mm depending on the size of the idler wheel, while the maximum first side plate axis thickness 138 may range from 14.9 mm to 16.9 mm. Other dimensional ranges are possible in other embodiments of the present disclosure.

Likewise, the outer rim 110 may further include a support surface 144 (so called since it supports the track chain assembly, thus surface may be interrupted axially by a guide ridge 146, or not) defining a support surface radial dimension 148 measured from the support surface 144 to the axis of rotation 102. The first side plate 112 may also define a transition point 150 where the first side plate axial thickness (e.g., see halfway radially between 138 and 142) stops changing. The transition point 150 may also be spaced a transition point radial distance 152 from the axis of rotation 102. A ratio of the support surface radial dimension 148 to the transition point radial distance 152 may range from 1.72 to 2.08 in some embodiments of the present disclosure. In some embodiments, the transition point radial distance ranges from 36.5 mm to 38.5 mm. Other ratios and dimensional ranges are possible in other embodiments of the present disclosure.

Again, this ratio may also help to provide the desired strength to withstand the weight of the machine and impact loads, while also minimizing the amount of material used to make the idler wheel without adversely affecting the flow of material during the casting process simultaneously. In some embodiments, the outer rim defines a tread diameter or overall diameter defined by the support surface that ranges from 456.0 millimeters (mm) to 770.0 millimeters (mm).

Still referring to FIG. 6, the first side plate exterior surface (e.g., see 128) or the second side plate exterior surface (e.g., see 128a) may include a purely radially extending portion 154 disposed radially adjacent the hub 108, as well as an angled portion 156 extending radially and axially outwardly from the purely radially extending portion 154 at a flare angle 158 to the radial direction 104 that ranges from 8.0 degrees to 10.0 degrees. This may not be the case in other embodiments of the present disclosure.

Also, the outer rim 110 may define a first axial extremity 160 of the idler wheel 100, and the purely radially extending portion 154 is spaced a first axial distance 162 away from the first axial extremity 160 that ranges from 30.0 mm to 33.0 mm in some embodiments of the present disclosure. The idler wheel 100 defines a midplane 163 (may be a plane of symmetry as shown, or not) disposed along the axis of rotation 102, and the purely radially extending portion 154 may be spaced away from the midplane 163 a second axial distance 164 that ranges from 46.5 mm to 49.5 mm in some embodiments of the present disclosure.

Furthermore, the angled portion 156 may be spaced away from the first axial extremity 160 a minimum axial distance 166 that ranges from 19.3 mm to 22.3 mm in some embodiment of the present disclosure. The axial spacing (see dimension 190) between the first axial extremity 160 of the outer rim, and the axial extremity of the hub may be around 10.5 mm (+/−0.5 mm) in some embodiments of the present disclosure.

With continued reference to FIG. 6, the hub 108 may define a concave arcuate surface 168 forming a radially lower portion 170 of the interior cavity 126, and the concave arcuate portion (or surface) 168 may be spaced a minimum radial distance 172 from the axis of rotation 102 that ranges from 65.0 mm to 68.0 mm in some embodiments of the present disclosure.

On the other hand, the first side plate 112, the second side plate 112a, and the outer rim 110 form a radially upper portion 174 of the interior cavity 126 may include a first inflecting arcuate surface 176 (so called since it looks like an "S" curve), a second inflecting arcuate surface 176a, and an at least partially purely axially extending surface 178 that is disposed radially proximate to a radially outermost portion or surface 180 of the idler wheel 100 that connects the first inflecting arcuate surface 176 to the second inflecting arcuate surface 176a.

The first inflecting arcuate surface 176 defines a first radial tangent 182, and the second inflecting arcuate surface 176a defines a second radial tangent 182a. A maximum interior cavity axial dimension 184 measured from the first radial tangent 182 to the second radial tangent 182a may range from 92.4 mm to 95.4 mm in some embodiments of the present disclosure.

In addition, the at least partially purely axially extending surface 178 includes a first concave axial end 186, a second concave axial end 186a, and defines a top maximum axial dimension 188 measured from the first concave axial end 186 to the second concave axial end 186a that ranges from 46.9 mm to 49.4 mm in some embodiments of the present disclosure.

Still looking at FIG. 6, the first inflecting arcuate surface 176 may include a first concave arcuate surface 192, and a first convex arcuate surface 194. Likewise, the second inflecting arcuate surface 176a includes a second concave arcuate surface 192a, and a second convex arcuate surface 194a. A minimum axial dimension 196 measured from the first concave arcuate surface 192 to the second concave arcuate surface 192a may range from 75.6 mm to 78.6 mm, while a maximum axial dimension 198 measured from the first convex arcuate surface 194 to the second convex arcuate surface 194a may range from 57.1 mm to 60.0 mm in some embodiments of the present disclosure.

Looking at FIG. 7, the hub 108 may define a lubrication groove 200 that is in communication with the central bore 134 that defines a groove axial width 202 that ranges from 34.5 mm to 37.5 mm. This groove may also define a groove outside radial vertex 204 with a sloping segment 206 extending from the groove outside radial vertex 204 that defines a slope angle 208 with a line 210 that is parallel to the axis of rotation 102 that ranges from 5.0 degrees to 7.0 degrees. Also, the groove outside radial vertex 204 may be spaced a vertex radial distance 212 away from the axis of rotation 102 that ranges from 53.5 mm 56.5 mm in some embodiments of the present disclosure.

Next, an idler wheel that has internal reinforcing ribs as mentioned earlier herein, and that may be cast will be discussed. In FIG. 7, such a rib(s) 124 may be disposed in the interior cavity 126, and may extend from the first side plate 112 to the second side plate 112 in a cross-sectional plane [300] ([i.e.,] e.g., the sectioned plane of FIG. 7; such as being parallel to a cross-sectional plane of an outer peripheral flange portion 300) containing the radial direction 104, and the axis of rotation 102. In some embodiments, the rib 124 may also define a rib aperture 302 extending circumferentially through the rib 124. The rib may lack an aperture in other embodiments of the present disclosure.

The rib aperture 302 may include a rib aperture perimeter 304 that has a radially inner concave curve 306, a radially outer concave curve 308, and a first angled segment 310 that radially and axially connects the radially inner concave curve 306 to the radially outer concave curve 308. The radially inner concave curve 306 may define a small radius 312, while the radially outer concave curve may define a large radius 314 with a ratio of the large radius to the small radius ranging from 1.40 to 1.75 in some embodiments of the present disclosure.

Also, the first angled segment 310 at least partially defines a rib cross-sectional thickness 318 (i.e., a minimum thickness in the cross-sectional plane 300 measured from the first angled segment to an exterior surface of the side plate) that ranges from 14.0 mm (millimeters) to 16.0 mm in certain embodiments of the present disclosure.

More particularly, the large radius 314 may range from 38.0 mm to 40.0 mm, whereas the small radius 312 may range from 24.0 mm to 26.0 mm. In some embodiments, the radially inner concave curve 306 is spaced away from the axis of rotation 102 a lower rib aperture radial spacing distance 320 (i.e., a minimum distance) ranging from 74.7 mm to 76.7 mm, while the radially outer concave curve 308 may be spaced away from the outer rim 110 (i.e., the circumferential surface 322 of the guide ridge 146) an upper rib aperture radial spacing distance 324 that ranges from 39.0 mm to 41.0 mm in some embodiments of the present disclosure.

As best seen in FIG. 8, the rib 124 may define a thickness 326 that is measured in a direction that is tangential to the circumferential direction 106 in an axial midplane 163 (i.e., the sectioned plane of FIG. 8) radially next to the outer rim 110 that ranges from 10.0 mm to 14.0 mm in certain embodiments of the present disclosure.

The configuration, ratios and dimensional ranges of any of the features of any of the embodiments discussed herein may be altered to be different than what has been explicitly discussed or shown depending on the application. Although the various dimensions, ratios, and configurations of the features discussed herein for various embodiments are suited for casting, they may also be used and beneficial for use in fabricated or assembled idler wheels.

INDUSTRIAL APPLICABILITY

In practice, an idler wheel according to any embodiment described herein may be provided, sold, manufactured, and bought etc. as needed or desired in an aftermarket or OEM (original equipment manufacturer) context. For example, an idler wheel may be used to retrofit an undercarriage of a machine already in the field or may be sold with a piece of equipment (e.g., a machine such as an excavator, a wheel loader, etc.) using that undercarriage at the first point of sale of the piece of equipment.

The idler wheel may be fabricated from iron, cast-iron, steel, or gray-cast iron or other suitable material that is durable, and that can be used in the casting process. The geometry of the idler wheel may be formed during the casting, and then may be rough machined and/or finish machined if necessary. Suitable machining processes may include milling, turning, electrical discharge machining, etc. The idler wheel may be separated from the gates, forming a gate blemish that may be proud, recessed, or some combination of proud and recessed relative to a surface of the idler wheel. The gate blemish may be removed by machining, grinding, etc.

Also, the hollow core(s) mentioned earlier herein may be loosened via a shaking process, or liquified and removed. The apertures may then be plugged to help prevent the ingress of debris, dirt, etc. when the idler wheel is used in the field. It is to be understood that the mold used to manufacture the idler wheel would actually be the negative image of the cast idler wheel before machining has been completed.

The inventor(s) have tested and/or performed FEA (finite element analysis) on the idler wheel disclosed herein for both strength, material flow during casting, lack of porosity, etc., and have found the idler to provide the suitable strength, and desired manufacturability that was sought simultaneously.

Figure 9:
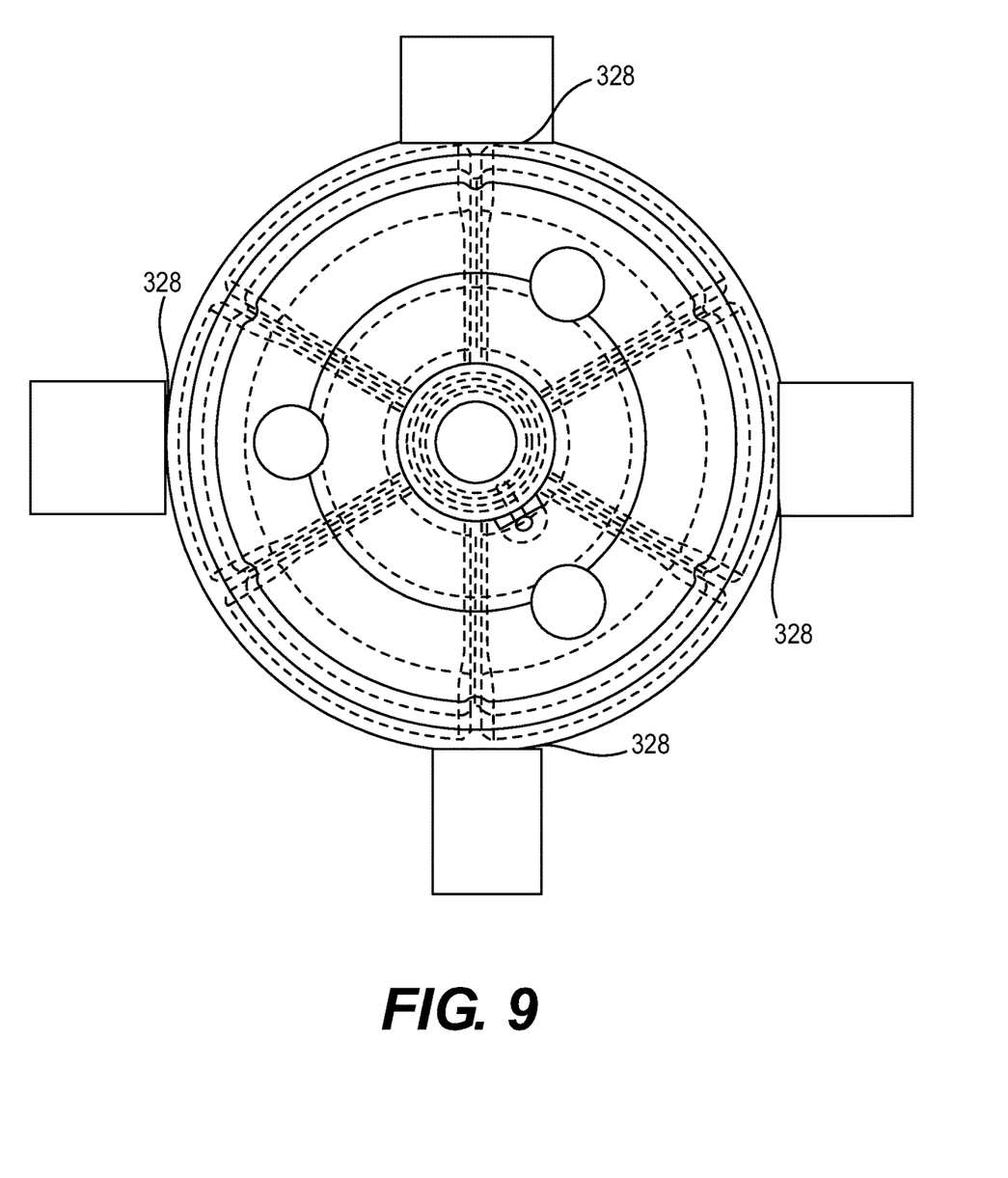
FIG. 9 is a side view of the idler wheel of FIG. 5 illustrating possible gate locations.

As used herein, the term "unitary" means that the idler wheel is not fastened, or welded together, but is cast in steps or one step depending on the application. For example, the hub and/or the side plates may be first cast together and then later the outer rim may be cast onto them. In such a case, the outer rim may be gated in a plurality of spots (e.g., circumferentially at ninety degree intervals, risers are also shown) leaving gate blemishes 328 as shown in FIG. 9. However, idler wheels that are fabricated, assembled, etc. are also contemplated to be within the scope of the present disclosure.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An idler wheel defining an axis of rotation, a radial direction, and a circumferential direction, the idler wheel comprising:
   a hub;
   an outer rim; and
   a first side plate, and a second side plate extending radially from the hub to the outer rim;
   wherein the hub, the outer rim, the first side plate, and the second side plate are formed as a unitary component, the first side plate defines a first thru-aperture, and the second side plate defines a second thru-aperture, and
   wherein the outer rim further defines at least one radially extending aperture that extends through the outer rim or a plurality of gate blemishes disposed on the outer rim.

2. The idler wheel of claim 1, wherein the hub defines a gate blemish of the plurality of gate blemishes.

3. The idler wheel of claim 2, wherein the hub defines a central bore that includes a cylindrical surface that defines the axis of rotation, and that defines the gate blemish.

4. An idler wheel comprising:
   a hub defining a cylindrical bore with an axis of rotation, a radial direction, and a circumferential direction;
   an outer rim; and
   a first side plate, and
   a second side plate extending radially from the hub to the outer rim;
   wherein the hub, the outer rim, the first side plate, and the second side plate form an interior cavity radially between the outer rim and the hub, and axially between the first side plate, and the second side plate, the first side plate defining a maximum first side plate axial thickness disposed radially next to the hub in a cross-sectional plane containing the radial direction and the axis of rotation, a minimum first side plate thickness disposed radially next to the outer rim, and a ratio of the maximum first side plate axial thickness to the minimum first side plate thickness ranges from 1.325 to 1.900.

5. The idler wheel of claim 4, wherein the outer rim further includes a support surface defining a support surface radial dimension measured from the support surface to the axis of rotation, the first side plate defines a transition point where a first side plate axial thickness stops changing, the transition point being spaced a transition point radial distance from the axis of rotation, and a ratio of the support surface radial dimension to the transition point radial distance ranges from 1.72 to 2.08, and the minimum first side plate thickness ranges from 8.0 mm to 28.0 mm.

6. The idler wheel of claim 5, wherein the first side plate defines a first side plate exterior surface that includes a radially extending portion disposed radially adjacent the hub, and an angled portion extending radially and axially outwardly from the radially extending portion at a flare angle to the radial direction that ranges from 8.0 degrees to 10.0 degrees, and the transition point radial distance ranges from 36.5 mm to 38.5 mm.

7. The idler wheel of claim 6, wherein the outer rim defines a first axial extremity of the idler wheel, and the radially extending portion of the first side plate exterior surface is spaced a first axial distance away from the first axial extremity that ranges from 30.0 mm to 33.0 mm, and the idler wheel defines a midplane disposed along the axis of rotation, and the radially extending portion of the first side plate exterior surface is spaced away from the midplane a second axial distance that ranges from 46.5 mm to 49.5 mm.

8. The idler wheel of claim 7, wherein the angled portion of the first side plate exterior surface is spaced away from the first axial extremity a minimum axial distance that ranges from 19.3 mm to 22.3 mm, and the midplane is a plane of symmetry for the idler wheel.

9. The idler wheel of claim 4, wherein the hub defines a concave arcuate surface forming a radially lower portion of the interior cavity, and the concave arcuate surface is spaced a minimum radial distance from the axis of rotation that ranges from 65.0 mm to 68.0 mm, and the outer rim defines a tread diameter that ranges from 456.0 mm to 770.0 mm.

10. The idler wheel of claim 4, wherein the first side plate, the second side plate, and the outer rim form a radially upper portion of the interior cavity that includes a first inflecting arcuate surface, a second inflecting arcuate surface, and an at least partially axially extending surface disposed radially proximate to a radially outermost portion of the idler wheel that connects the first inflecting arcuate surface to the second inflecting arcuate surface.

11. The idler wheel of claim 10, wherein the first inflecting arcuate surface defines a first radial tangent, the second inflecting arcuate surface defines a second radial tangent, and a maximum interior cavity axial dimension measured from the first radial tangent, to the second radial tangent ranges from 92.4 mm to 95.4 mm.

12. The idler wheel of claim 11, wherein the at least partially axially extending surface includes a first concave axial end, a second concave axial end, and defines a top maximum axial dimension measured from the first concave axial end to the second concave axial end ranging from 46.9 mm to 49.4 mm.

13. The idler wheel of claim 12, wherein the first inflecting arcuate surface includes a first concave arcuate surface and a first convex arcuate surface, the second inflecting arcuate surface includes a second concave arcuate surface and a second convex arcuate surface, a minimum axial dimension measured from the first concave arcuate surface to the second concave arcuate surface ranges from 75.6 mm to 78.6 mm, and a maximum axial dimension measured from the first convex arcuate surface to the second convex arcuate surface ranges from 57.1 mm to 60.0 mm.

14. The idler wheel of claim 4, wherein the hub defines a lubrication groove that is in communication with the central bore, the lubrication groove defining a groove axial width that ranges from 34.5 mm to 37.5 mm, a groove outside radial vertex with a sloping segment extending from the groove outside radial vertex, the groove outside radial vertex being spaced a vertex radial distance away from the axis of rotation ranging from 53.5 mm 56.5 mm, and the sloping segment defining a slope angle with a line parallel to the axis of rotation that ranges from 5.0 degrees to 7.0 degrees.

15. An idler wheel comprising:
a hub defining a cylindrical bore with an axis of rotation, a radial direction, and a circumferential direction;
an outer rim; and
a first side plate, and a second side plate extending radially from the hub to the outer rim;
wherein the hub, the outer rim, the first side plate, and the second side plate form an interior cavity radially between the outer rim and the hub, and axially between the first side plate, and the second side plate, and the idler wheel further comprises a rib in the interior cavity extending from the first side plate to the second side plate in a cross-sectional plane containing the radial direction and the axis of rotation, and the rib defines a rib aperture extending circumferentially through the rib, and
wherein the outer rim further defines at least one radially extending aperture that extends through the outer rim or a plurality of gate blemishes disposed on the outer rim.

16. The idler wheel of claim 15, wherein the rib aperture includes a rib aperture perimeter including a radially inner concave curve, a radially outer concave curve, and a first angled segment radially and axially connecting the radially inner concave curve to the radially outer concave curve.

17. The idler wheel of claim 16, wherein the radially inner concave curve defines a first radius, the radially outer concave curve defines a second radius, the first angled segment defines a rib cross-sectional thickness with an exterior surface of the first side plate ranging from 14.0 mm to 16.0 mm, and a ratio of the second radius to the first radius ranges from 1.40 to 1.75.

18. The idler wheel of claim 17, wherein the second radius ranges from 38.0 mm to 40.0 mm, the first radius ranges from 24.0 mm to 26.0 mm, the radially inner concave curve is spaced away from the axis of rotation a lower rib aperture radial spacing distance ranging from 74.7 mm to 76.7 mm, and the radially outer concave curve is spaced away from the outer rim an upper rib aperture radial spacing distance ranging from 39.0 mm to 41.0 mm.

19. The idler wheel of claim 15, wherein the rib defines a thickness measured in a direction that is tangential to the circumferential direction in an axial midplane radially next to the outer rim that ranges from 10.0 mm to 14.0 mm.

20. The idler wheel of claim 4, wherein the outer rim further defines at least one radially extending aperture that extends through the outer rim or a plurality of gate blemishes disposed on the outer rim.

21. The idler wheel of claim 1, wherein the at least one radially extending aperture extends through the outer rim.

22. The idler wheel of claim 1, wherein the at least one radially extending aperture extends through the plurality of gate blemishes disposed on the outer rim.

23. The idler wheel of claim 15, wherein the at least one radially extending aperture extends through the outer rim.

24. The idler wheel of claim 15, wherein the at least one radially extending aperture extends through the plurality of gate blemishes disposed on the outer rim.

* * * * *